United States Patent
Burns et al.

(10) Patent No.: US 8,234,347 B2
(45) Date of Patent: **\*Jul. 31, 2012**

(54) METHOD AND APPARATUS FOR EFFICIENTLY MANAGING "MESSAGES SENT" FILE AND RESENDING OF MESSAGES FROM MOBILE WIRELESS COMMUNICATION DEVICE

(75) Inventors: Anthony G. Burns, Waterloo (CA); Michael Thomas Hardy, Waterloo (CA); Darrell R. May, Waterloo (CA)

(73) Assignee: Research In Motion Limited, Waterloo, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/049,128

(22) Filed: Mar. 16, 2011

(65) Prior Publication Data

US 2011/0167124 A1 Jul. 7, 2011

Related U.S. Application Data

(63) Continuation of application No. 12/582,446, filed on Oct. 20, 2009, now Pat. No. 7,930,358, which is a continuation of application No. 11/002,583, filed on Dec. 3, 2004, now Pat. No. 7,631,043.

(51) Int. Cl.
  *G06F 15/16* (2006.01)

(52) U.S. Cl. .......... 709/207; 709/203; 709/206
(58) Field of Classification Search .......... 709/206, 709/207, 203
  See application file for complete search history.

(56) References Cited

U.S. PATENT DOCUMENTS

| | | | |
|---|---|---|---|
| 7,631,043 B2 * | 12/2009 | Burns et al. | 709/206 |
| 7,870,187 B2 * | 1/2011 | LaSalle et al. | 709/203 |
| 7,930,358 B2 * | 4/2011 | Burns et al. | 709/206 |
| 2004/0221012 A1 * | 11/2004 | Heumesser | 709/206 |

OTHER PUBLICATIONS

Burns et al., "Method and Appartus for Efficiently Managing "Messages Sent" File and Resending Messages From Mobile Wireless Communication Device", U.S. Appl. No. 12/582,446, filed Oct. 20, 2009.

* cited by examiner

*Primary Examiner* — David Lazaro
(74) *Attorney, Agent, or Firm* — Perry + Currier

(57) ABSTRACT

An enhanced email system incorporating mobile wireless communication devices includes program logic for efficiently managing (i.e., at least partially synchronizing) "messages sent" files in the mobile device and in a related message server. The exemplary program logic also more efficiently handles resending of previously sent email messages from the mobile wireless communication device (especially in the context of synchronized messages sent files) by sending to the message server only abbreviated unique message ID in the first instance. In this way, wireless bandwidth is conserved as is the device battery.

18 Claims, 4 Drawing Sheets

METHOD AND APPARATUS FOR EFFICIENTLY MANAGING "MESSAGES SENT" FILE AND RESENDING OF MESSAGES FROM MOBILE WIRELESS COMMUNICATION DEVICE

CROSS-REFERENCE TO RELATED APPLICATION

This is a continuation of pending patent application Ser. No. 12/582,446, filed Oct. 20, 2009, the contents of which are incorporated herein by reference, which is a continuation of U.S. application Ser. No. 11/002,583, filed Dec. 3, 2004, (U.S. Pat. No. 7,631,043) the contents of which are incorporated herein by reference.

BACKGROUND

1. Technical Field

This invention relates to apparatus, method and stored computer program media for managing "messages sent" files and/or resending of messages from mobile wireless communication devices.

2. Related Art

Various email systems are now well known and utilized by millions on a daily basis. Email systems typically maintain a stored file or folder containing current opened and unopened mail, previously sent mail, messages that have been "deleted" (e.g., in a "trash" file until also deleted therefrom), email address files for various categories of parties with whom communications have been made or may be made in the future (e.g., an "address book") and the like. Sometimes email systems also incorporate calendar, personal contact data, documents, check lists and the like as well.

Besides composing new email messages and sending them, most systems also include features for forwarding received emails onward to other recipients and for resending previously sent messages (e.g., possibly retracting the earlier message in favour of a later version or possibly sending the same message on to additional recipients or possibly resending a message which for some reason went astray and was never acknowledged or actually received by the intended recipient.

Such email systems become considerably more complicated when they include mobile wireless communication devices as well as a user's base PC or enterprise message server or the like. In this more complex email system, a given email message may have originated at the user's desktop PC (or at somebody else's PC or otherwise) or may have originated in the first instance from the mobile wireless communication device itself. It is thus possible that the file of previously sent messages maintained in the mobile wireless communication device is not always synchronized (i.e., identical in content) with the file of previously sent messages for that particular user (in either the user's desktop PC base unit or a message server associated therewith for an entire enterprise). While synchronization of address books and the like between a user's PC base unit and a mobile FDA or the like has been known for some time, many if not all prior email systems incorporating mobile wireless communication devices have apparently not maintained well synchronized "message sent" files. Perhaps at least partially for such reasons, when a message is being resent from a user's mobile wireless communication device, it has heretofore typically involved resending of the entire message (e.g., the message header and message body text in full) from the mobile wireless communication device to an enterprise message server or the like (from which that particular message was then re-iterated to the same or new message recipients).

At the same time, typically such prior email systems incorporating mobile wireless communication devices have for a long time used a shortcut technique for effecting replies to received messages and/or forwarding of received messages from the mobile wireless communication device. In particular, since in such instances the received message must already be resident at the enterprise message server which sent it to the mobile wireless communication device, rather than including the entire received message text in a reply to or forwarding of that message, an abbreviated unique reference ID was instead transmitted back to the enterprise message server. This reference ID was then treated as a request to find the appropriate uniquely associated message and then to add the reply text thereto and send it onward and/or to forward the message (possibly also with additional added message text).

However, in spite of the fact that such shortcut techniques/protocols have been in existence for many years in this context for replying to and/or forwarding incoming messages from a mobile wireless communication device, it does not appear that an analogous shortcut technique has previously been used for resending previously sent messages. In the past, when a message was resent from the mobile device, the entire contents of the message was sent from the device to the server. In some cases, particularly if there is not complete 100% current message syncing of the sent message files), not all previously sent message information (e.g., message body text) may be available at the mobile wireless communication device. However (particularly if synchronization of sent files is well maintained), then full message information for each previously sent message is likely to be already available at the server. Nevertheless, the prior art practice effectively has ignored this situation and required redundant message information to be sent across the wireless network which has been a waste of network- bandwidth and device battery.

BRIEF SUMMARY

We have now recognized that it is possible to avoid such needless waste of wireless bandwidth and/or device battery.

In exemplary embodiments an abbreviated (but unique) reference ID of the message is initially sent to the server to be resent, similar to what has previously been done for "replies" and "forwards". If the server recognizes the reference ID (i.e., has the message already stored) it simply resends that particular message. If not, the server informs the device that the received reference ID is unknown, and the device then sends the entire message (as it knows it) back to the server for resending.

This saves network bandwidth because in most cases the server already will have the original sent message available. When the server does not (hopefully a rare occurrence if the "sent message" files are frequently synchronized), the prior mechanism of requesting the device's version of the complete message is still available, so there is no downgrade of service from the user's perspective.

As may be noted, this is related to the previous protocol used when replying and forwarding from the device. It has now become apparent that this needs to be extended to resends, particularly with the introduction of syncing of sent items, - but wherein the syncing may also be abbreviated such that only message headers and reference ID's are regularly maintained at the device (i.e., for messages originating elsewhere). In this case, the device typically does not have the entire message on the device (just the message header) and typical prior implementations would require the device to request the entire message to be delivered to the device before the user could then resend that same message back from the device.

The exemplary protocol now allows resend from the mobile device by using, in most cases, only the message reference ID. That is, to resend the server now resends the original message as is (using the reference ID supplied by the device to find it). The identified message is simply found by the server and resent. If the message cannot be found by the server, the server responds with a transaction error. The device then sends the data that it has for this message (forward, reply or resend). Benefits of sending a reference ID (versus actual full message text data) at least include significant reduction in required network bandwidth and reduced device battery load. For example, in most cases, only a relatively small-sized reference ID will be required for sending to the server—rather than the whole message itself (which could be thousands of bytes).

For various reasons (in general, to save memory space on the device), the original message body may be truncated on the device. This is certainly true for messages that were originally sent from the user's desktop, but may also be true for messages truncated due to low memory storage conditions on the device. It is clearly a preferred method to not have to always download the entire message body to the device just to resend the same message back to the server from the device.

The invention may be embedded in hardware, software or a combination of hardware and software. The invention provides a method for achieving enhanced management of "messages sent" files and/or the resending of messages from mobile wireless communication devices. The exemplary embodiment is realized, in part, by executable computer program code (i.e., logic) which may be embedded in physical program memory media.

BRIEF DESCRIPTION OF THE DRAWINGS

These and other objects and advantages of this invention will be more completely understood and appreciated by careful study of the following more detailed description of at least one exemplary embodiment in conjunction with the accompanying drawings, in which.

DETAILED DESCRIPTION OF EXEMPLARY EMBODIMENTS

Figure 1:
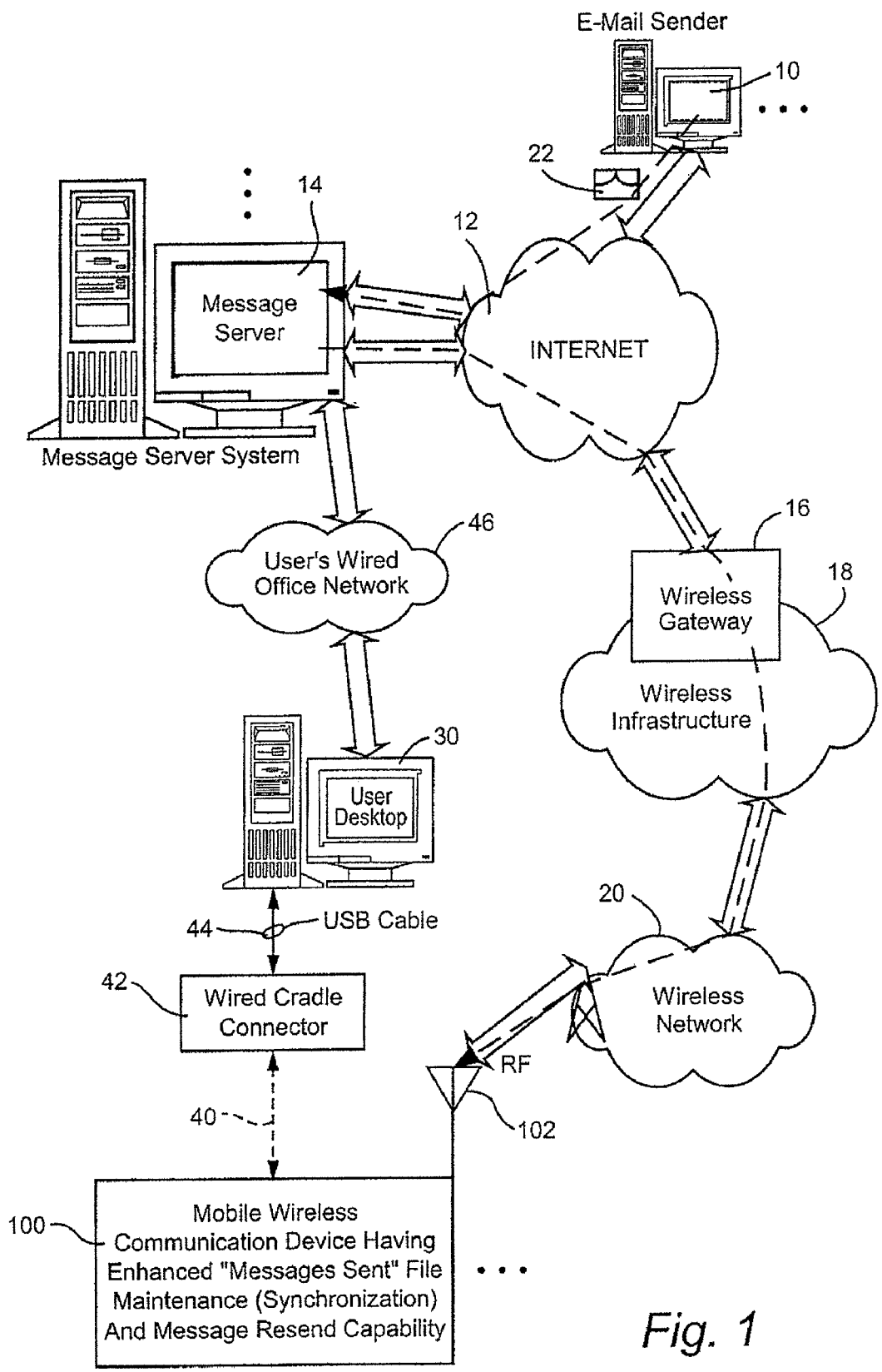
FIG. 1 is an overall system wide schematic view of an exemplary wireless email communication system incorporating a mobile wireless communication device having enhanced "messages sent" file maintenance (synchronization) and message resend capability in accordance with one exemplary embodiment of this invention.

FIG. 1 is an overview of an exemplary communication system in which a wireless communication device 100 (with an optional wired connection port 40) may be used in accordance with this invention. One skilled in the art will appreciate that there may be hundreds of different system topologies. There may also be many message senders and recipients. The simple exemplary system shown in FIG. 1 is for illustrative purposes only, and shows perhaps the currently most prevalent Internet e-mail environment.

FIG. 1 shows an e-mail sender 10, the Internet 12, a message server system 14, a wireless gateway 16, wireless infrastructure 18, a wireless network 20 and a mobile communication device 100.

An e-mail sender 10 may, for example, be connected to an ISP (Internet Service Provider) on which a user of the system has an account, located within a company, possibly connected to a local area network (LAN), and connected to the Internet 12, or connected to the Internet 12 through a large ASP (application service provider) such as American Online™ (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 14 may be implemented, for example, on a network computer within the firewall of a corporation, a computer within an ISP or ASP system or the like, and acts as the main interface for e-mail exchange over the Internet 12. Although other messaging systems might not require a message server system 14, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the invention described below. Message servers such as server 14 typically extend beyond just e-mail sending and receiving; they also include dynamic database storage engines that have predefined database formats for data like calendars, to-do lists, task lists, e-mail and documentation.

The wireless gateway 16 and infrastructure 18 provide a link between the Internet 12 and wireless network 20. The wireless infrastructure 18 determines the most likely network for locating a given user and tracks the users as they roam between countries or networks. A message is then delivered to the mobile device 100 via wireless transmission, typically at a radio frequency (RF), from a base station in the wireless network 20 to the mobile device 100. The particular network 20 may be virtually any wireless network over which messages may be exchanged with a mobile communication device.

As shown in FIG. 1, a composed e-mail message 22 is sent by the e-mail sender 10, located somewhere on the Internet 12. This message 22 typically uses traditional Simple Mail Transfer Protocol (SMTP), RFC 822 headers and multipurpose Internet Mail Extension (MIME) body parts to define the format of the mail message. These techniques are all well known to those skilled in the art. The message 22 arrives at the message server 14 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment, messages addressed to a message server account associated with a host system such as a home computer or office computer 30 which belongs to the user of a mobile device 100 are redirected from the message server 14 to the mobile device 100 as they are received.

Regardless of the specific mechanism controlling forwarding of messages to mobile device 100, the message 22, or possibly a translated or reformatted version thereof, is sent to wireless gateway 16. The wireless infrastructure 18 includes a series of connections to wireless network 20. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Group Special Mobile or the Global System for Mobile Communications (GSM) and the General Packet Radio Service (GPRS) networks, and (3) future third-generation (3G) networks like Enhanced Datarates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

The wireless RF communication port connection is made via antenna 102 as depicted in FIG. 1. However, the mobile wireless/wired communication device 100 also typically has a wired (or perhaps wireless irda, Bluetooth, etc.) connection port 40 which mates with a connection in a wired cradle 42 to establish a wired digital communication link via a USB cable 44 to USB port of the user desktop computer 30. As will be appreciated, the user's computer 30 is also connected to the user's wired office network 46 (as is the message server 14).

Figure 2:
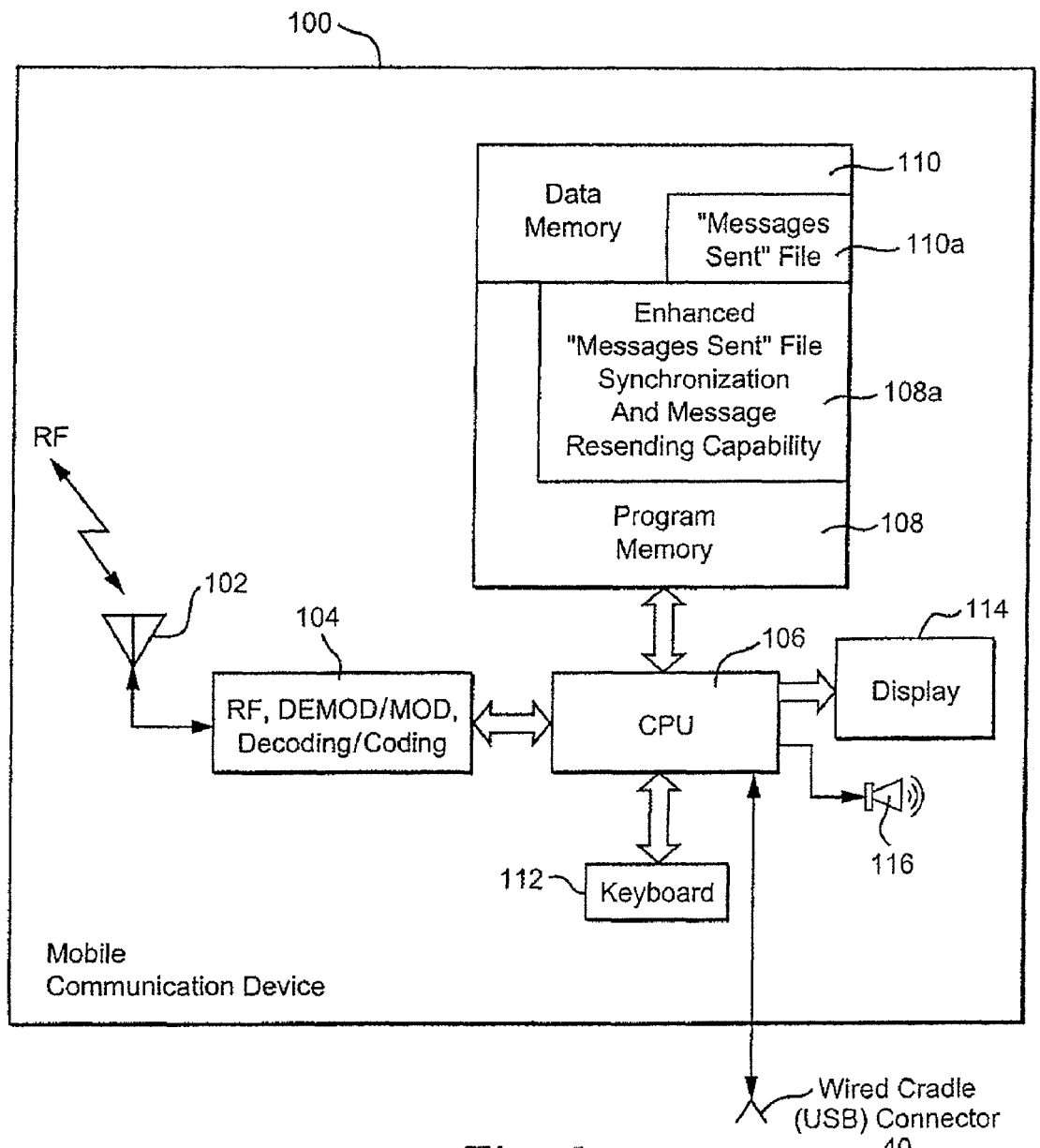
FIG. 2 is an abbreviated schematic diagram of hardware included within an exemplary mobile wireless communication device of FIG. 1.

As depicted in FIG. 2, mobile communication device 100 includes a suitable RF antenna 102 for wireless communication to/from wireless network 20. Conventional RF, demodulation/modulation and decoding/coding circuits 104 are provided. As those in the art will appreciate, such circuits can involve possibly many digital signal processors (DSPs), microprocessors, filters, analog and digital circuits and the like. However, since such circuitry is well known in the art, it is not further described.

The mobile communication device 100 will also typically include a main control CPU 106 which operates under control of a stored program in program memory 108 (and which has access to data memory 110 and a message sent file 110*a*). CPU 106 also communicates with a conventional keyboard 112, display 114 (e.g., an LCD) and audio transducer or speaker 116. A portion of program memory 108*a* is available for storing an enhanced messages sent file synchronization and message resending sub-routine (which may also interface with and use an IT Policy resident in data memory 110). Suitable computer program executable code is stored in portions of program memory 108*a* to constitute the enhanced sub-routine logic described below. As also depicted in FIG. 2, the CPU 106 is typically connected to a wired cradle USB connector 40 (which is, in effect, a USB port).

In the preferred exemplary embodiment, provisions are made for maintaining, at least partial synchronization of the messages sent files stored at the server 14 and the mobile wireless communication device 100. The exemplary embodiment of synchronization is referred to as "partial" because the messages sent file at the device 100 may not include full text for each message but, instead, only an abbreviated reference ID (preferably with header data sufficient to be user-recognizable) or the like to identify uniquely a particular previously sent message. At the same time, the server 14 will generally have a copy of the complete text of all previously sent messages in its messages sent file. Of course, as those in the art will appreciate, there typically will be conventional file housekeeping features available to permit purging records from the message sent files as may be desired by the user (or as necessitated by maximum file capacity or the like to avoid an excessive number of entries in a message sent file for a particular user).

Figure 3:
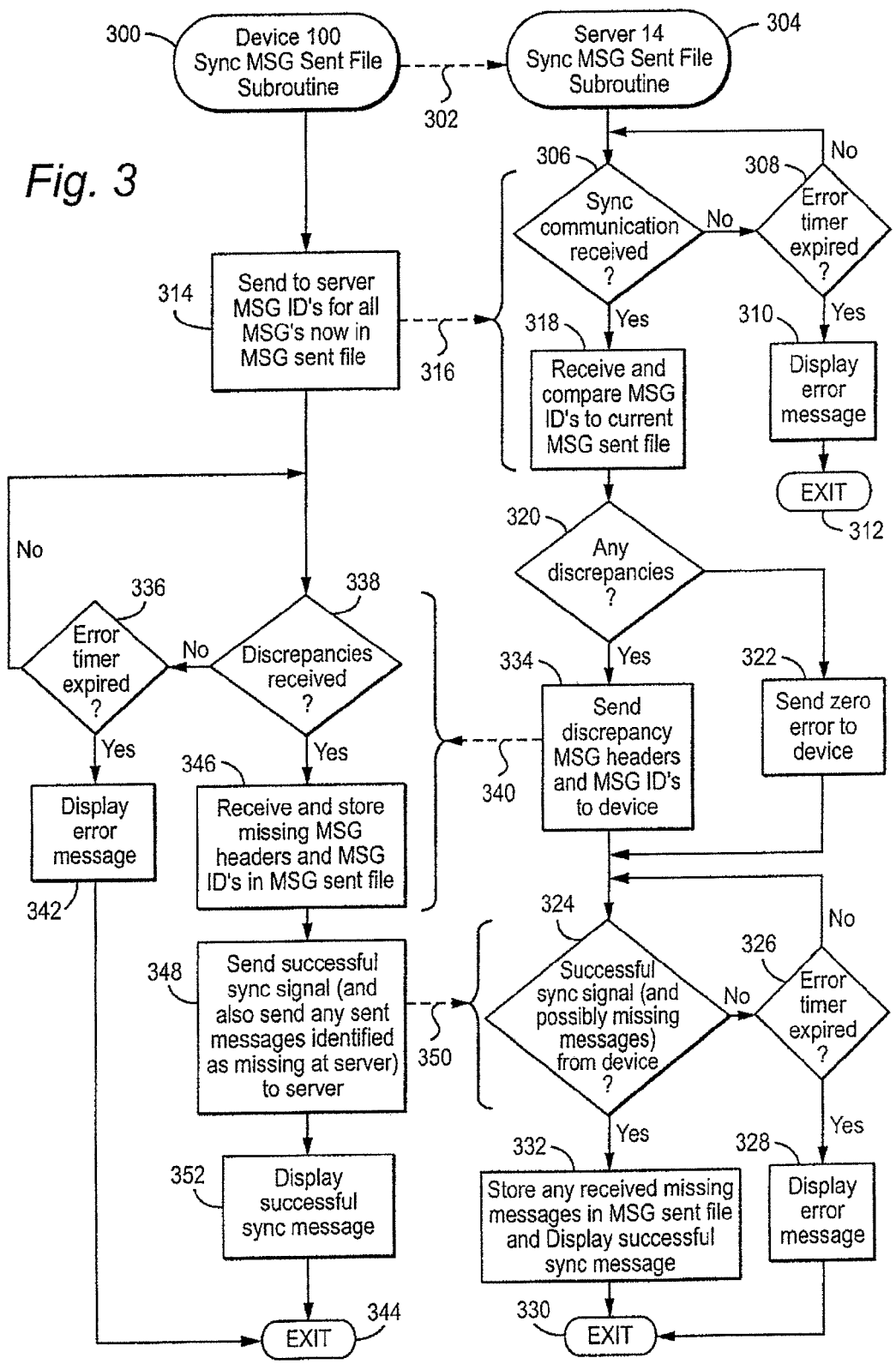
FIG. 3 is an exemplary abbreviated schematic flowchart of computer software (i.e., program logic) that may be utilized, in parallel, in the device of FIG. 2 and the message server of FIG. 1 to achieve an exemplary synchronization of "message sent" files at the device and server sides, respectively.

As depicted in FIG. 3, the device synchronization messages sent file sub-routine 300 may be activated by a user at device 100. This causes a suitable "begin sync" signal 302 to be sent to the server 14 so as to also initiate the server synchronization message sent file sub-routine at 304. During most, if not all, of the synchronization process, both sub-routines 300 and 304 are active. The server may thereafter simply wait for an expected synchronization communication 316 to be received (e.g., in a timed wait loop 306, 308). If the expected synchronization communication 316 is not timely received from the device, then an error message is displayed at 310 and the server sub-routine is exited at 312.

However, if the device sub-routine is operating successfully, then suitable synchronization message 316 will be generated at 314 and sent to the server. In an elementary implementation, this synchronization communication might include a listing of all message reference ID's for all messages now listed in the "messages sent" file at the device. However, as those in the art will appreciate, there are known file synchronization protocols and techniques that can, at least some of the time, make it unnecessary to exchange complete file content lists.

When the synchronization message from the device 100 is timely received, then it is processed at 318 so as to, in effect, compare (a) the received list of message ID's from the sent messages file at the device to (b) the current messages sent file content at the server. As previously noted, those in the art will appreciate that a laborious comparison of each and every entry in both files at each sync session can be avoided if desired under some circumstances.

If discrepancies are discovered at 320, then suitable discrepancy data is generated (e.g., identify messages missing in either the device and server) and sent back to the device at 334—before the timed wait loop 324, 326 is entered. If no discrepancies are noted at 320, then a zero error (i.e., synchronized) signal will be sent back to the device at 322 and another timed wait loop 324, 326 is then entered to await a successful synchronization signal (and message text for messages previously identified as missing at the server) back from the device. If this is not timely received from the device, then the received previously messages are stored and an error message may be displayed at 328 and the routine exited at 330. Otherwise, if a successful synchronization signal from the device is timely received, then a successful synchronization message is displayed at 332 before exit is taken at 330.

At the device 100, after the initial synchronization data 316 is transmitted at 314, a timed wait loop 336, 338 is entered to see if any discrepancies have been noted by the server in a return communication 340. If the expected discrepancy data message 340 is not timely received, then an error message is displayed at 342 and exit of the sub-routine is taken at 344. On the other hand, if a timely return message 340 is received, then it is processed at 346 so as to store missing message headers and message reference ID's or the like as may be necessary so as to synchronize (but preferably only partially) the messages sent file at the device 100. Upon completion of this processing, further processing is done at 348 so that any discovered missing messages at the server are sent to the server at 350 and/or a successive synchronization signal is generated and sent back to the server. A successful synchronization message is displayed at 352 before the device sub-routine is exited at 344.

Figure 4:
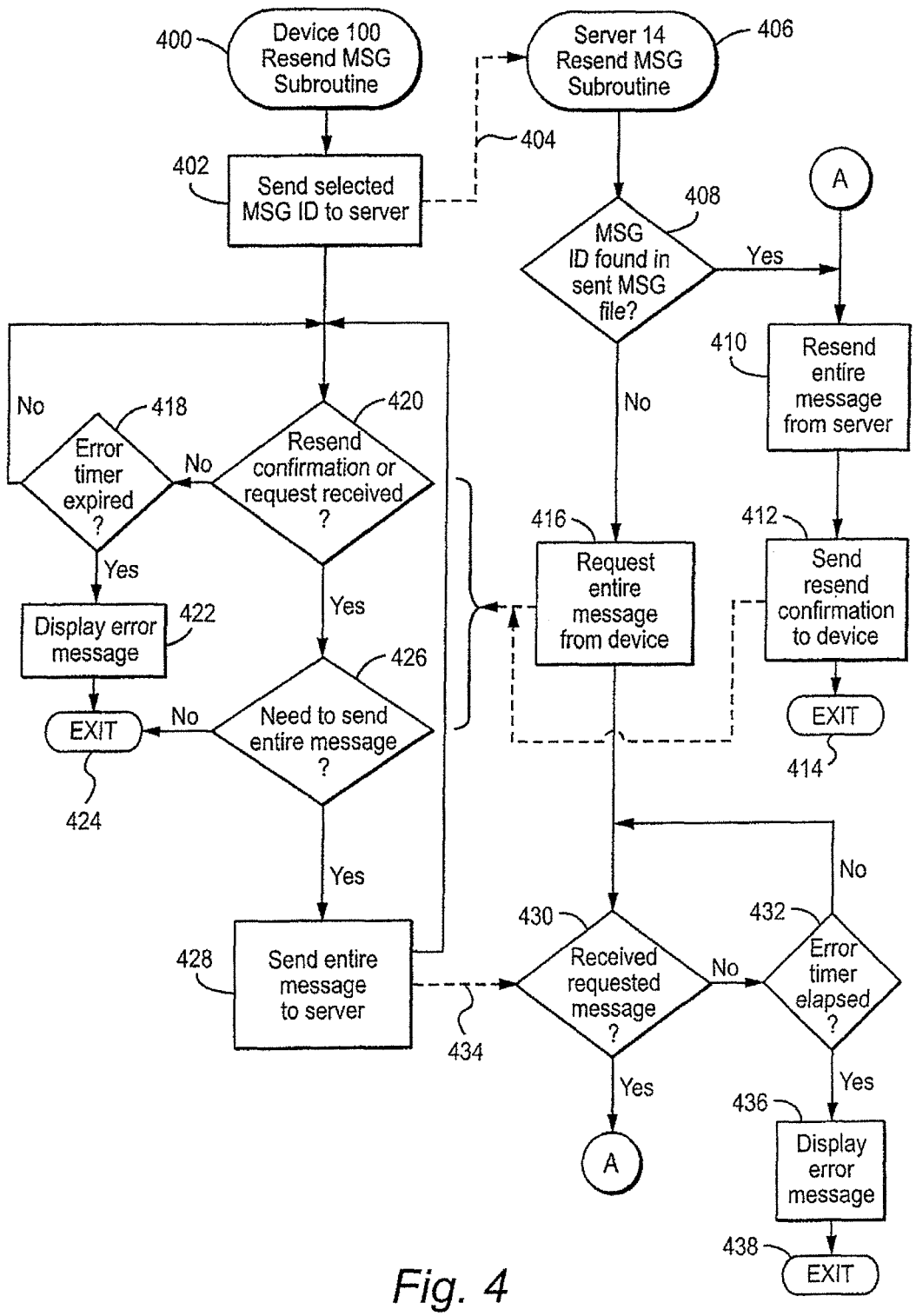
FIG. 4 is an exemplary of abbreviated schematic flowchart of computer software (i.e., program logic) that may be utilized in the device of FIG. 2 and the message server of FIG. 1 to achieve a more efficient resend message, functionality in the device and server, respectively.

When synchronized messages sent files are frequently maintained at the device and server, as already explained with respect to FIG. 3, then it is possible to more frequently than not save bandwidth and device battery by employing a resend message protocol such as depicted in FIG. 4. Here, for example, if a user wishes to resend a message from the device 100, then a resend message sub-routine is entered at 400 and, using user-recognizable message identifying data (e.g., all or part of the message header data) available in the local sent messages file, only an abbreviated message reference ID is accessed (e.g., also available from the local sent messages file) at 402 and transmitted at 404 to the server 14. This causes the server 14 to enter its enhanced resend message sub-routine at 406. At 408, the server 14 looks for the incoming message reference ID in its own, more complete, sent messages file. If such a message is found to reside there in its entirety (which is most likely to happen in the exemplary embodiment), then the entire message is resent at 410 from the server and a confirmation of that event is sent at 412 back to device 100 before exit is taken at 414. On the other hand, in the event (hopefully rare) that the server cannot find the message referenced by the incoming message reference ID at 408, then, at 416, a suitable request is sent from the server back to the device requesting more complete message details (e.g., the text of the message) as it may exist in the messages sent file of the device 100.

After sending the initial message reference ID at 402, the device 100 enters a timed wait loop 418, 420 waiting for either confirmation of the resend or a request for more message data to come back to it from the server. If a timely return message is not received, then an error message is displayed at 422 and exit of the sub-routine is taken at 424. On the other hand, if a timely returning message is received, then a test is made at 426 to see whether the returned signal indicates a need to send the entire message (if available) back to the server 14. If not, then exit is immediately taken at 424. On the other hand, if the server does not have enough information to resend the message from its own files, then the entire message text is sent from the device back to the server at 428 before the device re-enters the timed wait loop 418, 420 (to again await a confirmation of the resend having been successfully accomplished at the server 14).

If the server 14 sends a request for the entire message at 416, then it enters timed wait loop 430, 432 awaiting the requested further message data 434. If timely received, then control is passed back to 410 where the message is resent. If not timely received, then an error message is displayed at 436 and the sub-routine is exited at 438.

As those in the art will appreciate, the above described exemplary embodiments may be modified or varied in many ways while yet retaining novel features and advantages of this invention. Accordingly, all such modifications and variations are intended to be included within the scope of the appended claims.

The invention claimed is:

1. A mobile communication device comprising:
   a memory storing a sent messages file, said sent messages file comprising at least unique message ID data and message identifying data for each of previously sent messages; and
   a processor configured to:
     receive a resend command associated with a given previously sent messages; and, in response,
     send to an associated message server an abbreviated resend message request comprising a given unique message ID associated with said given previously sent message but not an entire message text.

2. The mobile communication device of claim 1, wherein said abbreviated resend message request comprises only said given unique message ID.

3. The mobile communication device of claim 1, wherein said processor is further configured to respond to a subsequent request from said associated message server by sending to said associated message server a further resend message request comprising said entire message text.

4. The mobile communication device of claim 1, wherein said processor is further configured to:
   send an entire sent message record to said associated message server when a full copy of an associated sent message is not found at said associated message server during a synchronization session.

5. A method comprising:
   maintaining a stored sent messages file in a memory of a mobile communication device, said stored sent messages file comprising at least unique message ID data and message identifying data for each of previously sent messages; and
   in response to receiving a resend command associated with a given previously sent message, sending to an associated message server from said mobile communication device an abbreviated resend message request comprising a given unique message ID associated with said given previously sent message but not an entire message text.

6. The method of claim 5, wherein said abbreviated resend message request comprises only said given unique message ID.

7. The method as in claim 5, further comprising:
   in response to a subsequent request from said associated message server, sending to said associated message server from said mobile communication device a further resend message request comprising said entire message text.

8. The method as in claim 5, further comprising:
   sending an entire sent message record to said associated message server when a full copy of an associated sent message is not found at said associated message server during a synchronization session.

9. A non-transitory computer program product, comprising a computer usable medium having a computer readable program code adapted to be executed to implement a method comprising:
   maintaining a stored sent messages file in a memory of a mobile communication device, said stored sent messages file comprising at least unique message ID data and message identifying data for each of previously sent messages; and
   in response to receiving a resend command associated with a given previously sent message, sending to an associated message server from said mobile communication device an abbreviated resend message request comprising a given unique message ID associated with said given previously sent message but not an entire message text.

10. The non-transitory computer program medium of claim 9, wherein said abbreviated resend message request comprises only said given unique message ID.

11. The non-transitory computer program medium of claim 9, wherein said method further comprises:
in response to a subsequent request from said associated message server, sending to said associated message server from said mobile communication device a further resend message request comprising said entire message text.

12. The non-transitory computer program medium of claim 9, wherein said method further comprises:
sending an entire sent message record to said associated message server when a full copy of an associated sent message is not found at said associated message server during a synchronization session.

13. A message server comprising:
a memory storing a sent messages file, said sent messages file comprising at least unique message ID data, message identifying data and associated message text for each of messages previously sent on behalf of an associated communication device; and
a processor configured to
receive, from said associated communication device, an abbreviated resend message request comprising a given unique message ID for a given previously sent message that is to be resent;
in response, search for a corresponding locally stored message using said given unique message ID; and, when found,
resend said corresponding locally stored message.

14. The message server of claim 13, wherein said processor is further configured to request said given previously sent message from said associated communication device when said corresponding locally stored message is not found at said server.

15. A method comprising:
maintaining a sent messages file in a memory associated with a message server, said sent messages file comprising at least unique message ID data, message identifying data and associated message text for each of messages previously sent on behalf of an associated communication device; and
in response to receiving from said associated communication device, an abbreviated resend message request comprising a given unique message ID for a given previously sent message that is to be resent, searching for a corresponding locally stored message using said given unique message ID; and, when found,
resending said corresponding locally stored message.

16. The method of claim 15, further comprising requesting said given previously sent message from said associated communication device when said corresponding locally stored message is not found at said server.

17. A non-transitory computer program product, comprising a computer usable medium having a computer readable program code adapted to be executed to implement a method for:
maintaining a sent messages file in a memory associated with a message server, said sent messages file comprising at least unique message ID data, message identifying data and associated message text for each of messages previously sent on behalf of an associated communication device; and
in response to receiving from said associated communication device, an abbreviated resend message request comprising a given unique message ID for a given previously sent message that is to be resent, searching for a corresponding locally stored message using said given unique message ID; and, when found,
resending said corresponding locally stored message.

18. The non-transitory computer program medium of claim 17, wherein said method further comprises:
requesting said given previously sent message from said associated communication device when said corresponding locally stored message is not found at said server.

* * * * *